United States Patent Office 3,513,167
Patented May 19, 1970

3,513,167
PRODUCTION OF PURE MELAMINE
Hermann Dieter Fromm, Ludwigshafen (Rhine), Rudolf Mohr, Lampertheim, and Matthias Schwarzmann and Horst Woehrle, Limburgerhof, Pfalz, Germany, assignors to Badische Anilin- & Soda-Fabrik Aktiengesellschaft, Ludwigshafen (Rhine), Germany
No Drawing. Filed Sept. 29, 1967, Ser. No. 671,583
Claims priority, application Germany, Oct. 6, 1966, 1,670,154
Int. Cl. C07d 55/24
U.S. Cl. 260—249.7                      2 Claims

ABSTRACT OF THE DISCLOSURE

Melamine is recovered from the reaction offgas from the thermal conversion of urea carried out at temperatures of 300° to 450° C. in the presence of catalysts, by cooling the gas to a temperature of 220° C. To increase the purity of the melamine the gas is previously cooled to a temperature above the dewpoint up to 360° C. and the solid thus obtained is separated separately.

---

In the production of melamine by heating urea in the presence of catalysts and adding ammonia, the melamine is carried away from the reaction zone in the gaseous state. The offgas escaping from the reaction zone contains mainly carbon dioxide and ammonia apart from the melamine formed by the reaction. The reaction is carried out as a rule at temperatures of more than 300° C. for example at temperatures of 350° to 550° C.

It is known that in order to separate melamine contained in the offgas, the latter may be cooled to 180° to 356° C., temperatures of 200° to 275° C. being preferred. Cooling may be effected for example by means of cooled walls or by the admixture of cold gas, liquid or solid. To remove the melamine remaining in the gas according to its vapor pressure, the gas may then be further cooled to temperatures of from 60° to 100° C.

Melamine obtained in this way has a high degree of purity of about 99.8%. It has been found however that this melamine may cause turbidity during its further processing into resins for reasons which are still unknown; this is not the case when using melamine which has been obtained by reaction of cyanamide.

The present invention has for its object to obviate the said troublesome phenomenon occurring in the further processing of melamine obtained by thermal conversion of urea in the presence of catalysts and ammonia.

We have found that surprisingly this object can be achieved by cooling the gas in a first stage to a temperature above the dewpoint up to 360° C., removing the solid thus deposited and then cooling the gas in a second stage to a temperature below 220° C. to precipitate pure melamine.

The dewpoint of melamine is not a precisely defined magnitude but is dependent on the concentration of the melamine in the offgas. As a rule the dewpoint is however in the range from 280° C. to 300° C. It is advantageous to cool the gas in the first stage to a temperature of 290° to 310° C. A small amount of solid separates in this stage and it has been shown by analytical investigation that this solid contains substantial amounts of melem. Cooling in accordance with the invention may be carried out in any known manner. Thus it is possible to cool the offgas by admixture of cold gas which is inert to the reaction gas, for example cold offgas which has been freed from melamine, or by admixture of cold solids. The cooling of the gas may be carried out with particular advantage in a tube cooler; surprisingly the solid does not form solid crusts on the walls of the cooler (as is usually the case when the offgas from the melamine synthesis is cooled) but separates as a finely crystalline dust which can readily be removed from the offgas, for example by means of filters.

Following the cooling in the first stage, the gas is cooled to temperatures below 220° C. in a second stage to separate pure melamine, advantageously to temperatures of 180° to 220° C. The melamine thus obtained has a purity of more than 99.8%. Resins which have been prepared using this melamine no longer exhibit turbidity even after having been stored for several months.

The process according to the invention is further illustrated by the following examples.

EXAMPLE 1

(a) 150 kg. per hour of urea together with 520 kg. per hour of a gas mixture of 2 parts by volume of ammonia and 1 part by volume of carbon dioxide is reacted in a fluidized-bed reactor in the presence of an aluminum oxide catalyst at a temperature of 390° C. to form melamine, the conversion being about 95%. The offgas leaving the reactor is cooled to 200° C. by mixing with it offgas at 130° C. which has already been freed from melamine. Melamine is thus deposited.

(b) Ureau is converted into melamine as described under (a) but the offgas containing melamine is cooled in a tube cooler to 300° C. prior to being cooled to 220° C. The particulate solid thus precipitated is separated from the gas by means of a dust filter. The gas is then cooled further to 200° C. by admixture of offgas at 130° C. which has been freed from melamine, melamine thus being deposited.

126 parts by weight of melamine obtained according to Example 1(a) is mixed with 740 parts by weight of butanol, 550 parts by weight of 33% formaldehyde solution, 70 parts by weight of toluene and 0.15 part by weight of phthalic anhydride and water is then distilled off azeotropically down to 109° C. A resin solution is obtained having a benzene compatibility of about 1:10. Finally it is concentrated to a solids content of about 60%.

After the resin solution has been stored in a closed container for about three months, turbidity occurs which is deleterious in the further application of the solution. In contrast to this, no turbidity occurs during the same period of time in the case of a resin solution obtained according to Example 1(b).

EXAMPLE 2

(a) In the manner described in Example 1(a), 150 kg. of urea is converted to melamine in the presence of an aluminum oxide catalyst at a temperature of 390° C., but with an addition of 230 kg. of pure ammonia. The offgas containing melamine is cooled to 200° C. by admixture of warm offgas which is free from melamine, so that the melamine is deposited.

(b) In the manner described under (a), urea is converted into melamine, but the offgas leaving the reactor is cooled in a tube cooler to 300° C. prior to cooling to 200° C.

Resin solutions prepared as described in Example 1 from melamine obtained according to Example 2(a) exhibit turbidity after having been stored for about three months, while no turbidity whatever occurs in resin solutions which have been prepared from melamine obtained according to Example 2(b).

We claim:
1. A process for separating pure melamine by cooling from offgas from the synthesis of melamine by thermal conversion of urea at temperatures of more than 300° up to 450° C. in the presence of ammonia and catalysts, wherein the offgas is cooled in a first stage to a temperature above the dewpoint and not greater than 360° C. and the solid thus formed is removed from the offgas which is then cooled in a second stage to a temperature of 180° to 220° C. to precipitate pure melamine.

2. A process as claimed in claim 1 wherein the offgas is cooled in the first stage to a temperature of from 290° to 310° C.

References Cited

UNITED STATES PATENTS

| | | | |
|---|---|---|---|
| 2,755,887 | 7/1956 | Boatright | 260—249.7 XR |
| 3,310,558 | 3/1967 | Oele et al. | 260—249.7 |

HENRY R. JILES, Primary Examiner

J. M. FORD, Assistant Examiner